United States Patent
Marason et al.

(10) Patent No.: US 9,557,630 B1
(45) Date of Patent: Jan. 31, 2017

(54) PROJECTION SYSTEM WITH REFRACTIVE BEAM STEERING

(71) Applicant: Amazon Technologies, Inc., Seattle, WA (US)

(72) Inventors: Eric Gifford Marason, San Francisco, CA (US); Miguel Virgen, Santa Clara, CA (US); Christopher David Coley, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 13/928,261

(22) Filed: Jun. 26, 2013

(51) Int. Cl.
  *G03B 21/14* (2006.01)
  *G02B 26/08* (2006.01)
  *H04N 9/31* (2006.01)

(52) U.S. Cl.
  CPC ........... *G03B 21/14* (2013.01); *G02B 26/0891* (2013.01); *H04N 9/3194* (2013.01)

(58) Field of Classification Search
  CPC .. H04N 9/3197; H04N 9/3105; H04N 9/3167; H04N 9/3129; H04N 9/3194; G02B 27/283; G02B 27/144; G02B 27/28; G02B 5/04; G02B 26/0833; G02B 26/0883; G03B 21/14; G11B 7/1356; G11B 7/08; G11B 7/12
  USPC ........ 353/20, 30, 28, 33, 37, 73, 77, 81, 98, 353/99, 121, 122; 359/211.2, 211.3, 227, 359/237, 196.1, 197.1, 198.1, 737, 203.1
  See application file for complete search history.

(56) References Cited

U.S. PATENT DOCUMENTS

| | | | |
|---|---|---|---|
| 4,850,686 A * | 7/1989 | Morimoto et al. | 359/196.1 |
| 6,549,700 B1 * | 4/2003 | Sweatt et al. | 385/25 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,659,845 B2 * | 2/2014 | Wan et al. | 359/831 |
| 2005/0195505 A1 * | 9/2005 | Braun et al. | 359/837 |
| 2007/0024978 A1 * | 2/2007 | Jackson | G02B 5/1814 359/569 |
| 2010/0027089 A1 * | 2/2010 | Nilsson | 359/201.1 |

(Continued)

FOREIGN PATENT DOCUMENTS

WO    WO2011088053 A2    7/2011

OTHER PUBLICATIONS

Yaguang Yang, Analytic Solution of Free Space Optical Beam Steering Using Risley Prisms, Nov. 1, 2008, Journal of Lightwave Technology vol. 26 No. 21, pp. 1-8.*

(Continued)

*Primary Examiner* — Bao-Luan Le
*Assistant Examiner* — Christopher Lamb, II
(74) *Attorney, Agent, or Firm* — Lee & Hayes, PLLC

(57) ABSTRACT

A projection system projects images onto a surface as part of an augmented reality environment. Users may interact with the images and this interaction is captured as feedback to the system. The projection system includes a refractive beam steerer to direct the projected images onto specific surfaces within the environment, even if the surfaces are moved about the area. The beam steerer has multiple wedge-shaped prisms that are independently movable to steer the projected light beam as desired. Additionally, an infrared (IR) device may be used to illuminate the environment with IR light, and the IR light may be emitted along a common optical path through the refractive beam steerer as used by the projected light beam.

23 Claims, 12 Drawing Sheets

(56) References Cited

U.S. PATENT DOCUMENTS

| | | | |
|---|---|---|---|
| 2010/0053591 A1* | 3/2010 | Gibson et al. | 356/3.09 |
| 2011/0043880 A1* | 2/2011 | Adams | G02B 7/1805 |
| | | | 359/221.2 |
| 2011/0310356 A1* | 12/2011 | Vallius | 353/31 |
| 2012/0019783 A1* | 1/2012 | Imai | G02B 27/104 |
| | | | 353/20 |
| 2012/0081706 A1* | 4/2012 | Cook et al. | 356/328 |
| 2012/0223885 A1 | 9/2012 | Perez | |
| 2014/0185119 A1* | 7/2014 | Staver | 359/211.3 |
| 2014/0293231 A1* | 10/2014 | Yoon | G03B 21/142 |
| | | | 353/20 |
| 2015/0198802 A1* | 7/2015 | Ando | G02B 27/0101 |
| | | | 359/200.8 |

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

\* cited by examiner

PROJECTION SYSTEM WITH REFRACTIVE BEAM STEERING

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection systems. Such improvements might include lighter weight, smaller form factors, and less obtrusive integration into the environment. Toward that end, one particular need is for compact projection systems that are able to project images onto any number of surfaces throughout the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment. The architecture may be implemented in many ways. One illustrative implementation is described below in which an augmented reality environment is created within a room. The architecture includes one or more projection and imaging systems. Multiple implementations are described. For instance, in one implementation, a system is equipped with a projector that employs refractive beam steering to enable images to be projected at various locations throughout a region of the environment. This projector has a small form factor for placement in non-obtrusive places, such as in a ceiling mount or in a structure that resembles a piece of furniture (e.g., common table lamp).

In another implementation, an infrared (IR) device is added to direct IR light into the environment in the direction of the projected images to illuminate the scene onto which the images are being projected. The IR light is reflected from objects in the environment and captured by the system to determine distances to the objects and other characteristics (e.g., surface contour, surface orientation and slope, etc.). In some embodiments, the IR light may be directed and captured along an optical path common to the projected images to reduce the size of the system. It is noted, however, that the various implementations of the architecture described herein are merely representative.

Figure 1:
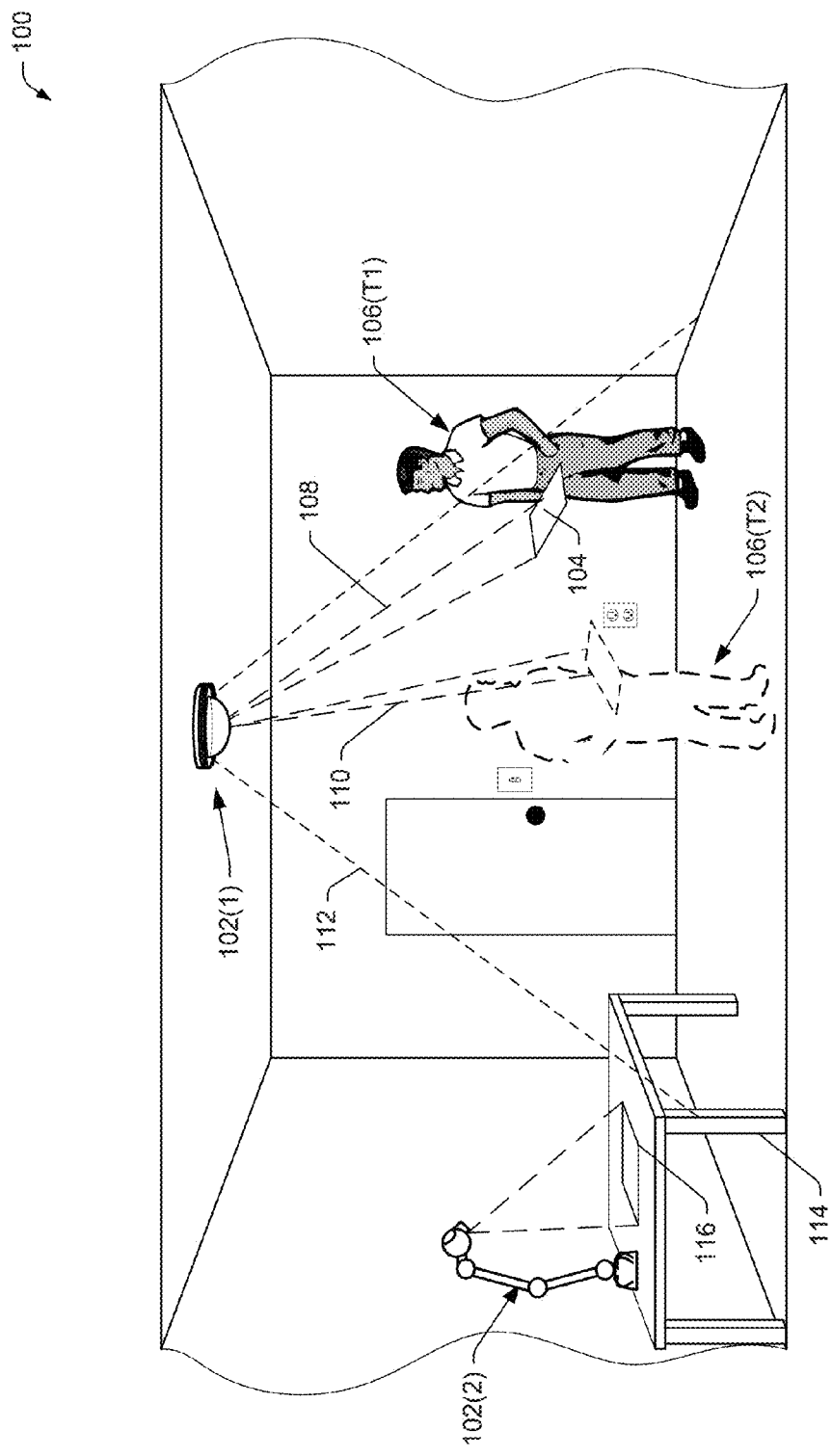
FIG. 1 shows an illustrative scene with an augmented reality environment hosted in an environmental area, such as a room. The augmented reality environment is provided, in part, by two projection and imaging systems.

FIG. 1 shows an illustrative augmented reality environment 100 created within a scene, and hosted within an environmental area, which in this case is a room. Two augmented reality functional nodes (ARFN) 102(1)-(2) are shown within the room. Each ARFN may contain one or more projectors, cameras, IR devices, and computing resources that are used to generate the augmented reality environment 100. In this illustration, the first ARFN 102(1) is a fixed mount system that may be mounted within the room, such as to the ceiling, although other placements are possible. The first ARFN 102(1) is configured to project images onto the scene in any number of locations within the environment. In FIG. 1, the ARFN 102(1) employs a projection system oriented to project images in a downward direction from the ceiling. The projected images are passed through a refractive beam steerer to guide the projection onto various surfaces in the environment 100. As one example, the ARFN 102(1) may direct the projected images onto a surface of a portable projection screen 104 that is being carried by a user 106. The projected images are represented as being guided along a path 108 onto the portable projection screen 104. The user 106 is shown at a first location at time T1, and hence is referenced as 106(T1).

Suppose that over time, the user moves to another location at time T2 as indicated by a phantom FIG. 106(T2). The ARFN 102(1) includes functionality to track movement of the portable screen 104 as the user 106 moves about the room, and continues to project the images onto the screen 104. As the screen 104 is moved, the refractive beam steerer of the ARFN 102(1) steers the projected images in a corresponding direction along a path 110 so that the user continues to experience a relatively stable image relative to the screen 104.

More generally, depending upon the configuration of the refractive beam steerer, a single ARFN may cover an entire region of the room from the illustrated central ceiling mount. In FIG. 1, the coverage available to the ceiling-mounted ARFN 102(1) is represented by the dashed conical zone 112. Thus, as the user walks about the room within this zone 112, the image will appear persistently and stable on the user's personal screen 104.

A second ARFN 102(2) is embodied to resemble a table lamp, which is shown sitting on a desk 114. The second ARFN 102(2) projects images 116 onto the surface of the desk 114 for the user to consume and interact. The projected images 116 may contain any type of content, such as homework, video games, news, recipes, and so on.

These are just sample locations for the ARFNs 102(1)-(2). In other implementations, one or more ARFNs may be placed around the room in any number of arrangements, such as on in furniture, on the wall, beneath a table, and so forth.

Figure 2:
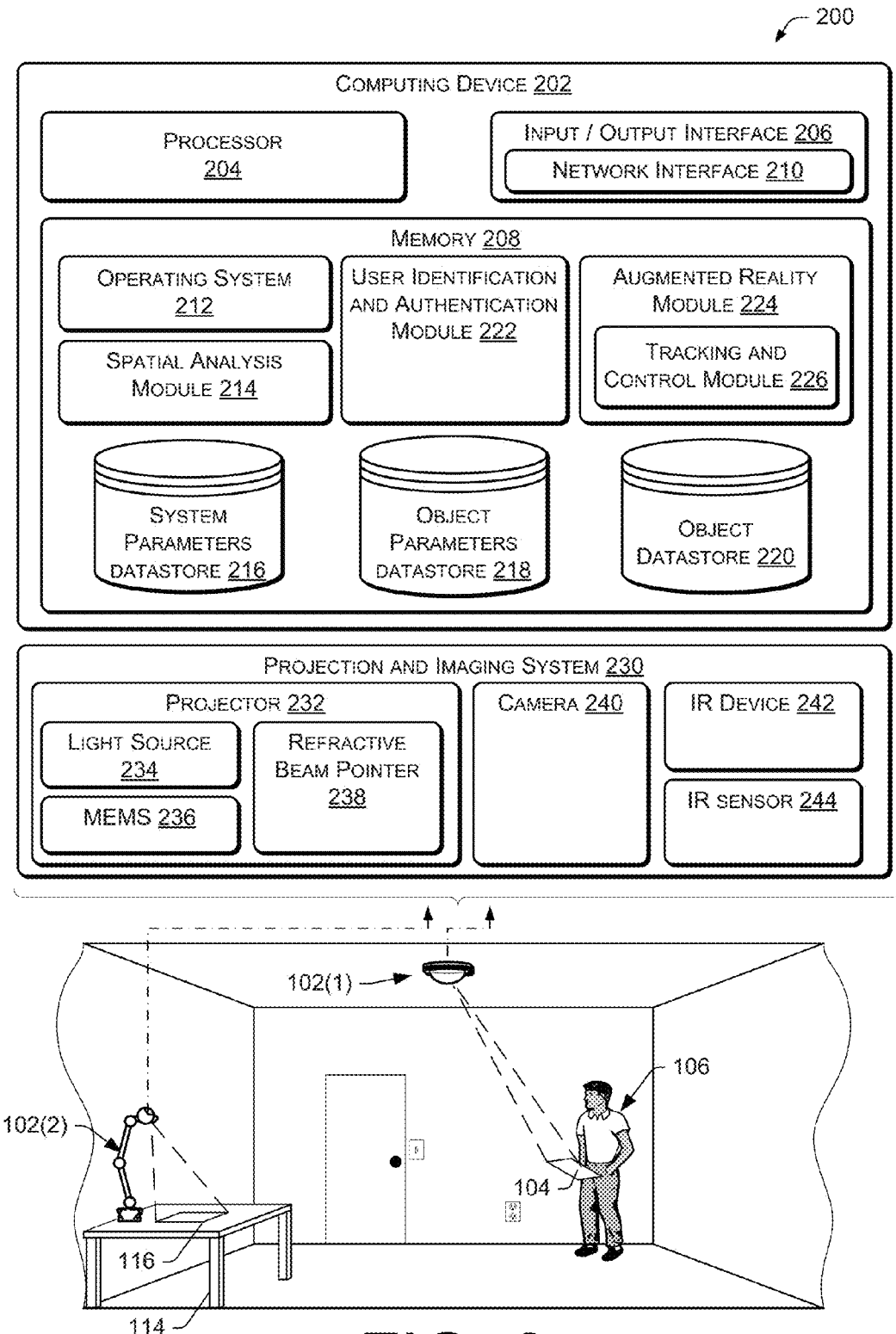
FIG. 2 is a block diagram that illustrates select functional components of the projection and imaging system.

FIG. 2 illustrates an example architecture 200 of the ARFN 102, with select functional components described in more detail. Associated with each ARFN 102, or with a collection of ARFNs, is a computing device 202, which may be located either within the augmented reality environment or disposed at another location external to it. Each ARFN 102 may be connected to the computing device 202 via a wired network, a wireless network, or a combination of the two. The computing device 202 has a processor 204, an input/output interface 206, and a memory 208. The processor 204 may include one or more processors configured to execute instructions. The instructions may be stored in memory 208, or in other memory accessible to the processor 204, such as storage in cloud-based resources.

The input/output interface 206 may be configured to couple the computing device 202 to other components, such as projectors, cameras, microphones, other ARFNs, other computing devices, and so forth. The input/output interface 206 may further include a network interface 210 that facilitates connection to a remote computing system, such as cloud computing resources. The network interface 210 enables access to one or more network types, including wired and wireless networks. More generally, the coupling between the computing device 204 and any components may be via wired technologies (e.g., wires, fiber optic cable, etc.), wireless technologies (e.g., RF, cellular, satellite, Bluetooth, etc.), or other connection technologies.

The memory 208 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 208 and configured to execute on a processor, such as the processor 204. An operating system module 212 is configured to manage hardware and services within and coupled to the computing device 202 for the benefit of other modules.

A spatial analysis module 214 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light and to time-of-flight analysis, although other techniques may be used. The spatial analysis module 214 provides the information used within the augmented reality environment to provide an interface between the physicality of the scene and virtual objects and information.

A system parameters datastore 216 is configured to maintain information about the state of the computing device 202, the input/output devices of the ARFN, and so forth. For example, system parameters may include current position settings of the cameras and projectors, settings for the audio/video components, and so forth. As used in this disclosure, the datastore includes lists, arrays, databases, and other data structures used to provide storage and retrieval of data.

An object parameters datastore 218 and an object datastore 220 in the memory 208 are configured to maintain information about the state of objects within the scene. The object parameters may include object identity, surface contour of the object, overall reflectivity, color, and so forth. This information may be acquired from the ARFN, other input devices, or via manual input and stored within the object parameters datastore 218.

The object datastore 220 is configured to maintain a library of pre-loaded reference objects. This information may include assumptions about the object, dimensions, and so forth. For example, the object datastore 220 may include a reference object of a beverage can and include the assumptions that beverage cans are either held by a user or sit on a surface, and are not present on walls or ceilings. The spatial analysis module 214 may use this data maintained in the datastore 220 to test dimensional assumptions when determining the dimensions of objects within the scene. In some implementations, the object parameters in the object parameters datastore 218 may be incorporated into the object datastore 220. For example, objects in the scene which are temporally persistent, such as walls, a particular table, particular users, and so forth may be stored within the object datastore 220. The object datastore 220 may be stored on one or more of the memory of the ARFN, storage devices accessible on the local network, or cloud storage accessible via a wide area network.

A user identification and authentication module 222 is stored in memory 208 and executed on the processor(s) 204 to use one or more techniques to verify users within the environment. In one implementation, the ARFN 102 may capture an image of the user's face and the spatial analysis module 214 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 222 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 224 is configured to generate augmented reality output in concert with the physical environment. The augmented reality module 224 may employ essentially any surface, object, or device within the environment to interact with the users. The augmented reality module 224 may be used to track items within the environment that were previously identified by the spatial analysis module 214.

The augmented reality module 224 includes a tracking and control module 226 configured to track one or more items within the scene and accept inputs from or relating to the items. For instance, the tracking and control module 226 may use information from the image capture system or time-of-flight sensors to discern the location and position of the portable projection screen 104. With this information, the projection system can project in-focus images onto the screen 104 even as the user moves around the room.

The example ARFN architecture 200 may further include a projection and imaging system 230 for projecting images onto the surfaces within the environment and for capturing images of the environment that may be used to decipher gestures and other movement. The projection and imaging system 230 may further be configured to characterize the room and discern distances to objections through the use of the captured images (e.g., stereoscopic imaging) or other technologies (e.g., structured light, LIDAR, optical time-of-flight, ultrasonic ranging, radar, etc.).

As illustrated, the projection and imaging system 230 has a projector 232 that generates and projects images into the environment. These images may be visible light images perceptible to the user, visible light images imperceptible to the user, images with non-visible light, or a combination thereof. This projector 232 may be implemented with any number of technologies capable of generating an image and projecting that image onto a surface within the environment.

The projector 232 includes a light source 234 to generate visible light used to convey the images into the environment. In one example implementation, the light source 232 is a color laser, such as red, blue, and green laser light sources. The light is directed onto a microelectromechanical system (MEMS) 236 that is configured to create pixels of the visible image to be projected into the environment. The MEMS 236 may be implemented, for example, as a scanning mirror or with individual reflective elements that can be turned on/off to create the desired image. In some implementations, the light source 234 and MEMS 236 may be packaged or integrated into the same device. Furthermore, while a laser light source and MEMS are illustrated, suitable alternative projector technologies include a digital micromirror device (DMD), liquid crystal on silicon display (LCOS), liquid crystal display, 3LCD, and so forth.

The images from the MEMS 236 are passed images along an optical path that may include any number of lens elements to zoom and/or focus the images for projection into the environment. As part of the optical path, a refractive beam steerer 238 is configured to steer the projected images to a range of locations within the environment. The beam steerer 238 may direct the projected images toward various surfaces and objects in the room, such as the surface of the portable screen 104. One particular implementation of the beam steerer involves multiple wedge-shaped prisms that are independently adjustable to guide the projection beam to specific places in the room. This implementation will be described in more detail below beginning with FIG. 5.

The projection and imaging system 230 further includes a camera 240 configured to image the scene in visible light wavelengths, non-visible light wavelengths, or both. The camera 240 may be implemented in several ways. In some instances, the camera may be embodied an RGB camera. In other instances, the camera may include time-of-flight (ToF) sensors. In still other instances, the camera 240 may be an RGBZ camera that includes both ToF and RGB sensors.

In some implementations, the projection and imaging system 230 may further include an IR device 242 that is used to emit infrared light into the environment. The IR light may be used to characterize the room and ascertain shapes and distances to objects. The IR light is reflected by the objects in the environment and some of the reflected light is collected by the ARFN 102. In some implementations, the IR light emitted by the IR device 242 is directed along the same optical path as the projected images, and hence passes through the beam steerer 238. In other implementations, the IR light is emitted separate from the optical path. Examples of an IR device 242 might include an IR laser, IR LEDs, and so forth.

A photodiode or other IR sensor 244 may be used to detect the reflected IR light for further processing. For instance, time-of-flight determinations may be based on the collected IR light to help discern distances to surfaces in the environment, including a target surface on the screen 104.

It is noted that the IR device 242 and the IR sensor 244 may be implemented as part of the projector 232, as part of the camera 240, or separately from either the projector 232 or camera 240.

The ARFNs 102, computing device 202, and projection and imaging system 230 that have been described thus far may be operated to create an augmented reality environment. In this environment, images are projected onto various surfaces and items in the room, and the user 106 may interact with the images. The user's movements, voice commands, and other interactions are captured by the ARFNs 102 to facilitate user input to the environment.

Figure 3:
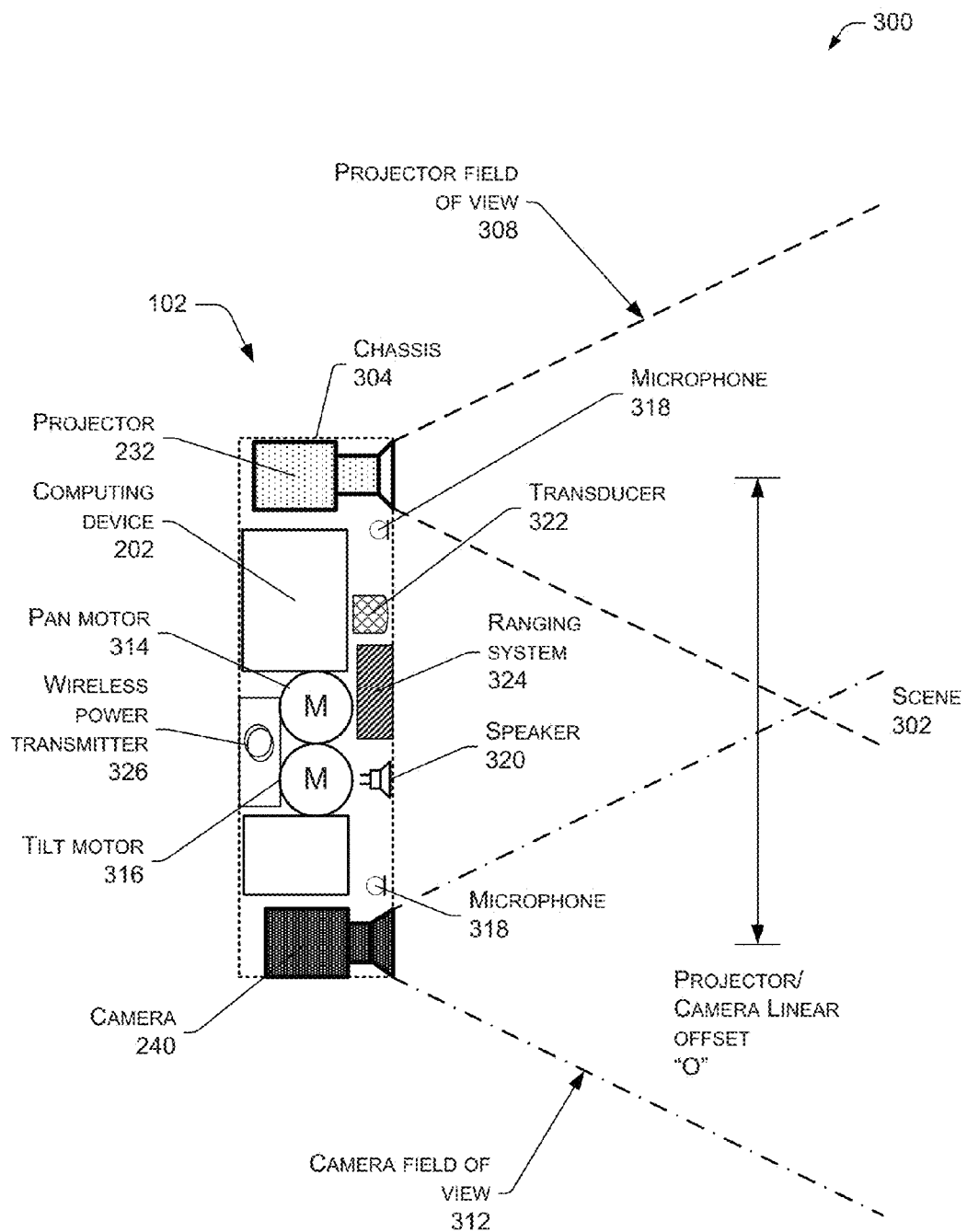
FIG. 3 shows one implementation of the projection and imaging system formed as an augmented reality functional node having a projector and camera in spaced relation to one another.

FIG. 3 shows an illustrative schematic 300 of an augmented reality functional node 102 and selected components. The ARFN 102 is configured to scan at least a portion of a scene 302 and the objects therein. The ARFN 102 may also be configured to provide augmented reality output, such as images, sounds, and so forth.

A frame or chassis 304 holds the components of the ARFN 102. Within the chassis 304 may be disposed the projector 232 that generates and projects images into the scene 302. These images may be visible light images perceptible to the user, visible light images imperceptible to the user, images with non-visible light, or a combination thereof. The projector 232 has a projector field of view 308 which describes a particular solid angle. The projector field of view 308 may vary according to changes in the configuration of the projector. For example, the projector field of view 308 may narrow upon application of an optical zoom to the projector. In some implementations, a plurality of projectors 232 may be used. Further, in some implementations, the projector 232 may be further configured to project patterns, such as non-visible infrared patterns, that can be detected by camera(s) and used for 3D reconstruction and modeling of the environment. The projector 232 may comprise a microlaser projector, a digital light projector (DLP), cathode ray tube (CRT) projector, liquid crystal display (LCD) projector, light emitting diode (LED) projector or the like.

A camera 240 may also be disposed within the chassis 304. The camera 240 is configured to image the scene in visible light wavelengths, non-visible light wavelengths, or both. As noted above, the camera 240 may be implemented in several ways, such as an RGB camera. In other instances, the camera may include ToF sensors. In still other instances, the camera 240 may be an RGBZ camera that includes both ToF and RGB sensors. The camera 240 has a camera field of view 312 which describes a particular solid angle. The camera field of view 312 may vary according to changes in the configuration of the camera 240. For example, an optical zoom of the camera may narrow the camera field of view 312. In some implementations, a plurality of cameras 240 may be used.

The chassis 304 may be mounted with a fixed orientation, or be coupled via an actuator to a fixture such that the chassis 304 may move. Actuators may include piezoelectric actuators, motors, linear actuators, and other devices configured to displace or move the chassis 304 or components therein such as the projector 232 and/or the camera 240. For example, in one implementation, the actuator may comprise a pan motor 314, tilt motor 316, and so forth. The pan motor 314 is configured to rotate the chassis 304 in a yawing motion. The tilt motor 316 is configured to change the pitch of the chassis 304. By panning and/or tilting the chassis 304, different views of the scene may be acquired. The spatial analysis module 214 may use the different views to monitor objects within the environment.

One or more microphones 318 may be disposed within the chassis 304, or elsewhere within the scene. These microphones 318 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 318 may be used to receive voice input from the user for purposes of identifying and authenticating the user. The voice input may be received and passed to the user identification and authentication module 222 in the computing device 202 for analysis and verification.

One or more speakers 320 may also be present to provide for audible output. For example, the speakers 320 may be used to provide output from a text-to-speech module, to playback pre-recorded audio, etc.

A transducer 322 may be present within the ARFN 102, or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102.

A ranging system 324 may also be provided in the ARFN 102 to provide distance information from the ARFN 102 to an object or set of objects. The ranging system 324 may comprise radar, light detection and ranging (LIDAR), ultrasonic ranging, stereoscopic ranging, and so forth. In some implementations, the transducer 322, the microphones 318, the speaker 320, or a combination thereof may be configured to use echolocation or echo-ranging to determine distance and spatial characteristics.

A wireless power transmitter 326 may also be present in the ARFN 102, or elsewhere within the augmented reality environment. The wireless power transmitter 326 is configured to transmit electromagnetic fields suitable for recovery by a wireless power receiver and conversion into electrical power for use by active components in other electronics, such as a non-passive screen 104. The wireless power transmitter 326 may also be configured to transmit visible or non-visible light to communicate power. The wireless power transmitter 326 may utilize inductive coupling, resonant coupling, capacitive coupling, and so forth.

In this illustration, the computing device 202 is shown within the chassis 304. However, in other implementations all or a portion of the computing device 202 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN accessible via a local area network, cloud resources accessible via a wide area network connection, or a combination thereof.

The ARFN 102 is characterized in part by the offset between the projector 232 and the camera 240, as designated by a projector/camera linear offset "O". This offset is the linear distance between the projector 232 and the camera 240. Placement of the projector 232 and the camera 240 at distance "O" from one another aids in the recovery of structured light data from the scene. The known projector/camera linear offset "O" may also be used to calculate distances, dimensioning, and otherwise aid in the characterization of objects within the scene 302. In other implementations, the relative angle and size of the projector field of view 308 and camera field of view 312 may vary. Also, the angle of the projector 232 and the camera 240 relative to the chassis 304 may vary.

Due to this offset "O", the projector 232 and camera 240 employ separate optical paths. That is, the projector 232 employs a set of lenses to project images along a first optical path therein, and the camera 240 employs a different set of lenses to image the scene by capturing the light scattered by the surroundings.

In other implementations, the components of the ARFN 102 may be distributed in one or more locations within the environment 100. As mentioned above, microphones 318 and speakers 320 may be distributed throughout the scene. The projector 232 and the camera 240 may also be located in separate chassis 204.

Figure 4:
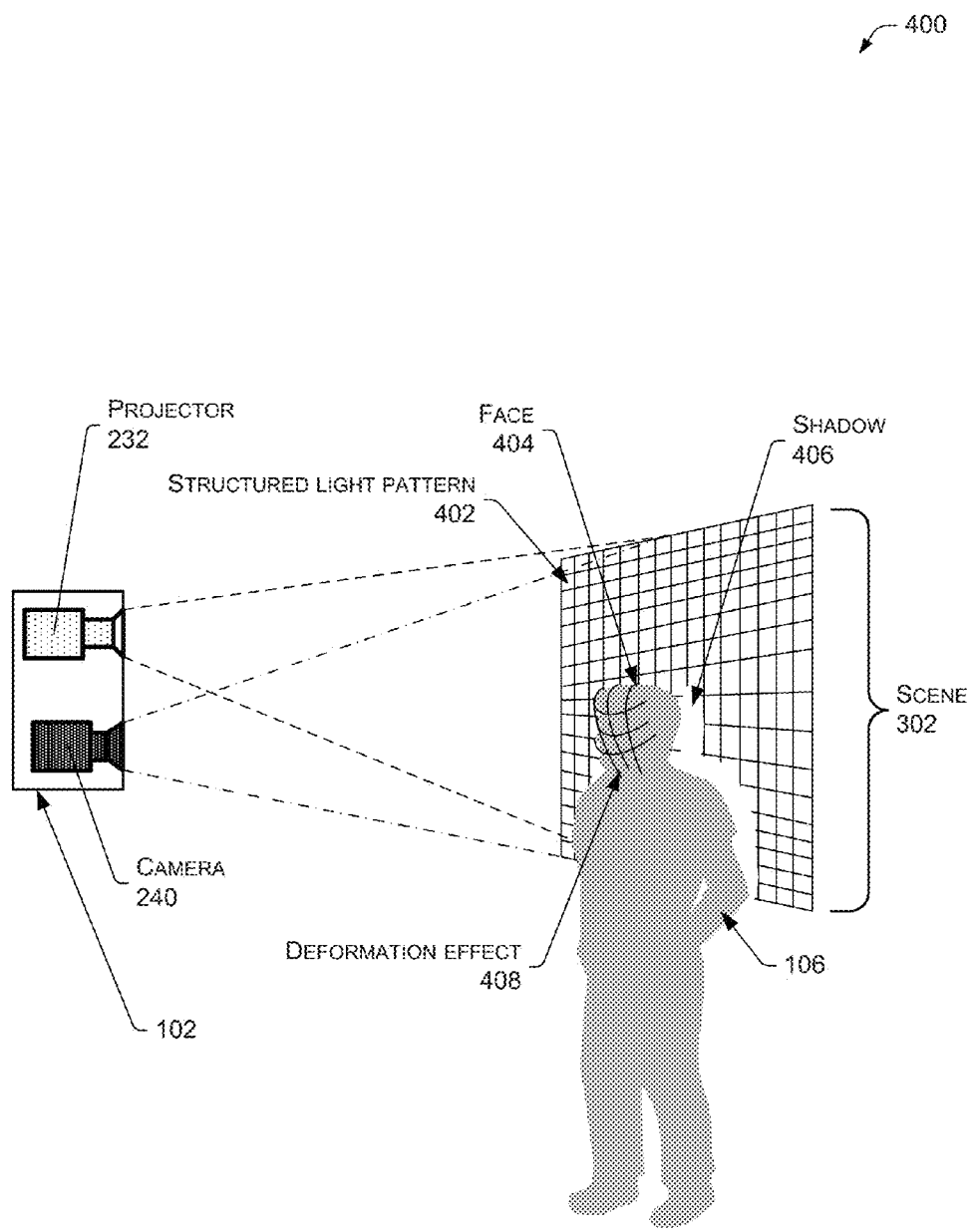
FIG. 4 illustrates one example implementation of creating an augmented reality environment by projecting a structured light pattern on a scene and capturing a corresponding image of the scene.

FIG. 4 illustrates one example operation 400 of the ARFN 102 of creating an augmented reality environment by projecting a structured light pattern onto a scene in the environment and capturing a corresponding image of the scene. In this illustration, the projector within the ARFN 102 projects a structured light pattern 402 onto the scene 302. In some implementations, a sequence of different structure light patterns 402 may be used. This structured light pattern 402 may be in wavelengths which are visible to the user, non-visible to the user, or a combination thereof. The structured light pattern 402 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 302 such that the user's face 404 is between the projector 232 and a wall. A shadow 406 from the user's body appears on the wall. Further, a deformation effect 408 is produced on the shape of the user's face 404 as the structured light pattern 402 interacts with the facial features. This deformation effect 408 is detected by the camera 240, which is further configured to sense or detect the structured light. In some implementations, the camera 240 may also sense or detect wavelengths other than those used for structured light pattern 402.

The images captured by the camera 240 may be used for any number of things. For instances, some images of the scene are processed by the spatial analysis module 214 to characterize the scene 302. In some implementations, multiple cameras may be used to acquire the image. In other instances, the images of the user's face 404 (or other body contours, such as hand shape) may be processed by the spatial analysis module 214 to reconstruct 3D images of the user, which are then passed to the user identification and authentication module 222 for purposes of verifying the user.

Certain features of objects within the scene 302 may not be readily determined based upon the geometry of the ARFN 102, shape of the objects, distance between the ARFN 102 and the objects, and so forth. As a result, the spatial analysis module 214 may be configured to make one or more assumptions about the scene, and test those assumptions to constrain the dimensions of the scene 302 and maintain the model of the scene.

Figure 5:
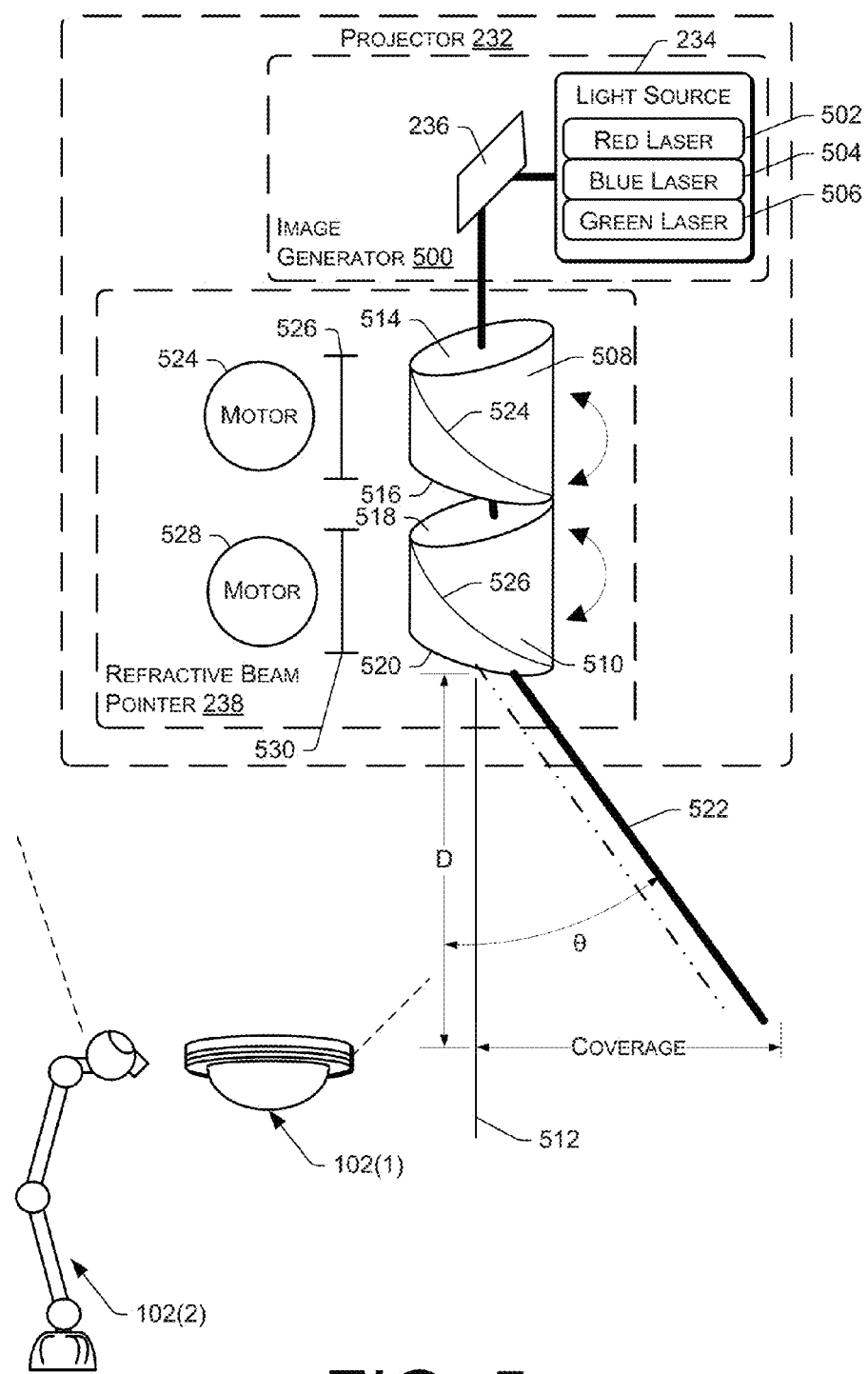
FIG. 5 shows a first implementation of a projector used in the projection and imaging system. The projector employs refractive beam steering that is embodied, in part, with a rotating dual prism assembly.

FIG. 5 shows a first implementation of the projector 232 used in the projection and imaging system 230 of FIG. 2, which may be implemented as part of each ARFN 102(1) and 102(2). The projector 232 has an image generator 500 to generate a visible color light beam for carrying images to be projected onto a surface in the environment and a beam steerer 238 to direct the light beam onto the surface, even if the surface is moving about the environment. The image generator 500 includes the light source 234, which in this implementation is embodied as a laser light source having a red laser 502, a blue laser 504, and a green laser 506. Each laser can provide different levels of intensity. The red, blue, green laser light paths are combined into a single modulated light path through use of various optical elements. The modulated light path represents a full array or pallet of colors. The sizes of the red, blue, and green lasers can vary, but in some implementations may be made very small due to diode laser technology. One example size for a red 635 nm laser 502 may be 4 mm in diameter and 10 mm in length. A blue 440 nm laser 504 may have a diameter of 4 mm and a length of 10 mm, while a green 532 nm laser 506 may have an 11 mm diameter and a 65 mm length.

The image generator 500 further includes the MEMS 236. The laser light source 234 directs the modulated light path onto the MEMS 236, which produces the pixels of the images. The MEMS 236 provides an (x, y) scanner that allows for vector and raster scanning of the projected image. Further, roll adjustment is possible through rotation of the MEMS chip. In one implementation, the MEMS chip may be compact in size, with one example size being 14 mm in length by 14 mm in width by 5 mm in thickness. As noted earlier, in some implementations, the image generator 500 may be configured as a single device that includes both the laser light sources and the MEMS chip.

The image generator 500 outputs the light beam along an optical path that includes the refractive beam steerer 238. In the illustrated implementation, the refractive beam steerer 238 includes multiple wedge-shaped prisms 508 and 510 that are independently rotatable about a center axis 512. The wedge-shaped prisms 508 and 510 may be formed with a cylindrical body having opposing end surfaces 514/516 and 518/520 that are slanted along planes that are non-perpendicular to the center axis 512. The slanted end surfaces 514/516 and 518/520 are oppositely angled to form the wedge shape, where one side of the cylindrical body between the end surfaces is shorter than the other side of the cylindrical body. The end surfaces may be angled at essentially any angles relative to the center axis, depending in part on how large of an area the projector is designed to cover, on the number of prisms used, and on how to maintain a consistent steering angle for the three color lasers (i.e., red, green, and blue lasers) to align and hit the same pixel on the screen. In this way, the center axis 512 is not normal to the angled end surfaces of the wedge-shaped prisms 508 and 510. The angles relative to the center axis 512 may range from approximately 20 degrees to approximately 70 degrees. In one example implementation, the end surfaces 514/516 and 518/520 of the respective prisms 508 and 510 are angled at +/−22.73 degrees relative to a perpendicular plane from the center axis 512. In another example implementation, the outer end surfaces (i.e., end surface 514 of the prism 508 and end surface 520 of the prism 510) are angled at 14.04 degrees relative to a perpendicular plane from the center axis 512 and the inner end surfaces (i.e., end surface 516 of the prism 508 and end surface 518 of the prism 510) are angled at 27.83 degrees relative to a perpendicular plane from the center axis 512. While two prisms are shown in FIG. 5, more than two prisms may be employed in other implementations.

It is noted that in other implementations only one of the end surfaces for each prism 508 or 510 is angled relative to the perpendicular plane from the center axis 512. That is, one end surface is angled and the other is perpendicular to the center axis 512. In one configuration, the first or entrance surface where the light beam enters the prism (e.g., surfaces 514 or 518) may be perpendicular to the center axis 512 while the second or exiting surface where the light beam exits the prism (e.g., surfaces 516 or 520) may be non-perpendicular.

The wedge-shaped prisms 508 and 510 may be similar in size and shape, or different in size and/or shape. The prisms 508 and 510 may range in dimensions of 5-20 mm in diameter to 5 to 20 mm in length. For instance, in one implementation, the wedge-shaped prisms 508 and 510 are approximately equal in size, with an example size of approximately 7 mm in diameter by 7 mm in length. In another example implementation, the first wedge-shaped prism 508 has a diameter of 6 mm and a center thickness of 7 mm and the second wedge-shaped prism 510 has a diameter of 14 mm and a center thickness of 14 mm. This implementation of different sized prisms is shown in the example embodiment of FIG. 10.

In the example shown in FIG. 5, the two wedge prisms 508 and 510 may be formed of one or more light transmissive materials. As one example, the wedge prisms are designed to be achromatic. One suitable implementation to make the prism assembly achromatic involves the pairing of a crown glass (e.g., Schott PK51A with Refractive index=1.528 and Abbe=76.97) and a flint glass (e.g., Schott N-LASF41 with Refractive index=1.835 and Abbe=43.13). Angled interfaces 524 (for prism 508) and 526 (for prism 510) are illustrated in FIG. 5 as separating the two types of glass. In one implementation, the interface surfaces are angled at angles within a range of approximately 40 degrees to approximately 50 degrees. More specifically, in one implementation, the interface surfaces are angled at approximately 45.05 degrees relative to a perpendicular plane from the center axis 512. In another implementation, the interface surfaces are angled at approximately 21.21 degrees relative to a perpendicular plane from the center axis 512. The prisms may further have antireflection (AR) coating at the laser wavelengths (e.g., T %<0.25% at 440 nm, 532 nm, 635 nm, and 930 nm). It is further noted that in other implementations, more than two types of glass may be used to form each prism, resulting in more than one angled internal surface.

The projected light from the MEMS 236 enters the first angled surface 514 of the prism 508, pass through the prism and glass interface 524, and exits the second angled surface 516 of the prism 510. Due to the angled surfaces throughout the glass prism, refraction of the light causes the light path to change direction. Assuming the incoming light path is parallel with the center axis 512, the exiting light beam may no longer be parallel with this axis. The exiting light beam then passes through the second prism 510, entering through the first angled surface 518, traversing the interface surfaces 526, and exiting through the second angled surface 520. Once again, due to the angled surfaces of the glass prism, the projected light is bent or refracted again. Depending upon the alignment of the two prisms 508 and 510, the projected light beam may be guided in any number of directions. The projected light beam leaving the projector, which is referenced as beam 522, is shown at a substantial angle θ to the center axis 512. Depending upon the configuration of the prisms, this angle may range from 0 degrees to as much as approximately 75-80 degrees. Accordingly, the wedge-shaped prisms use refraction to steer the light beam.

As noted, the prisms 508 and 510 are independently rotatable about center axis 512. A first motor 524 is coupled via a gearing mechanism 526 to rotate the first prism 508. Similarly, a second motor 528 is coupled via a gearing mechanism 530 to rotate the second prism 510. The motors 524 and 528 may be relatively silent, low power motors. The motors may provide for low torque movement and precision positioning and adjustment of the prisms. The gearing mechanisms 526 and 530 may be implemented as any sort of mechanical, electromechanical, or electromagnetic coupling that transfers power from the motor to rotate or otherwise adjust the prisms 508 and 510. Because the prisms may be rotated independently, various combinations of the slanted end surfaces may be produced to thereby effectively steer the projected light onto any location within the environment. More specifically, the dual prism combination enables the projector to direct the beam within a cone of coverage defined by a distance D from the projector to the environment and the angle θ achievable through refraction of the light by the slanted end surfaces 514-520 of the prisms 508 and 510. Accordingly, as the motors independently rotate the prisms, various locations within the cone of coverage can be targeted. For instance, as the user 106 walks around the room in environment 100 of FIG. 1, the screen 104 is tracked and the prisms may be rotated to steer the projection beam onto the screen 104.

While no other optical lenses are shown in FIG. 5, it is noted that the optical path may further include other types of lens, such as zoom lenses, focus lenses, spreader lenses, and so forth. These lenses may be placed in any number of locations of the optical path, including between the image generator 500 and beam steerer 238 or after the beam steerer 238. For instance, in one implementation, a spreader lens may be positioned after the prisms to provide an even wider cone of coverage. Further, an interior lens may be placed between the MEMS 236 and the beam steerer 238 to change the size of the projected image prior to directing the image into the environment.

Figure 6:
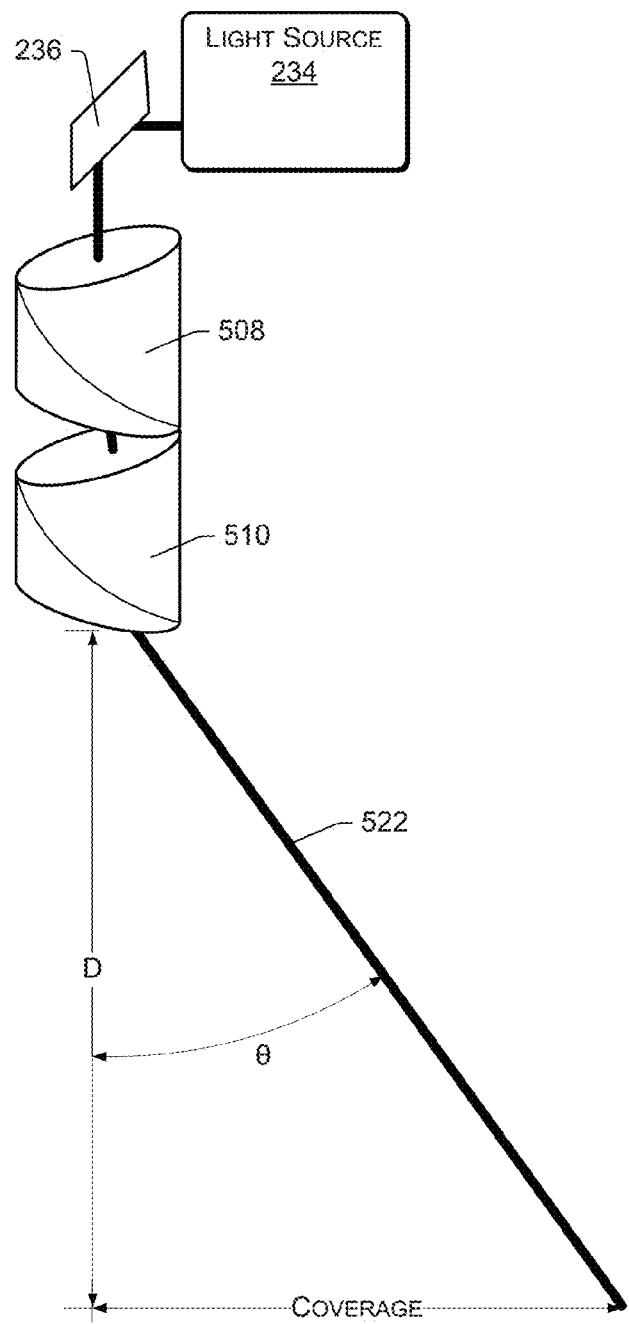
FIGS. 6-8 illustrate a sequence of operational positions of dual prism assembly to direct the projection beam in different directions within the environment.
Figure 7:
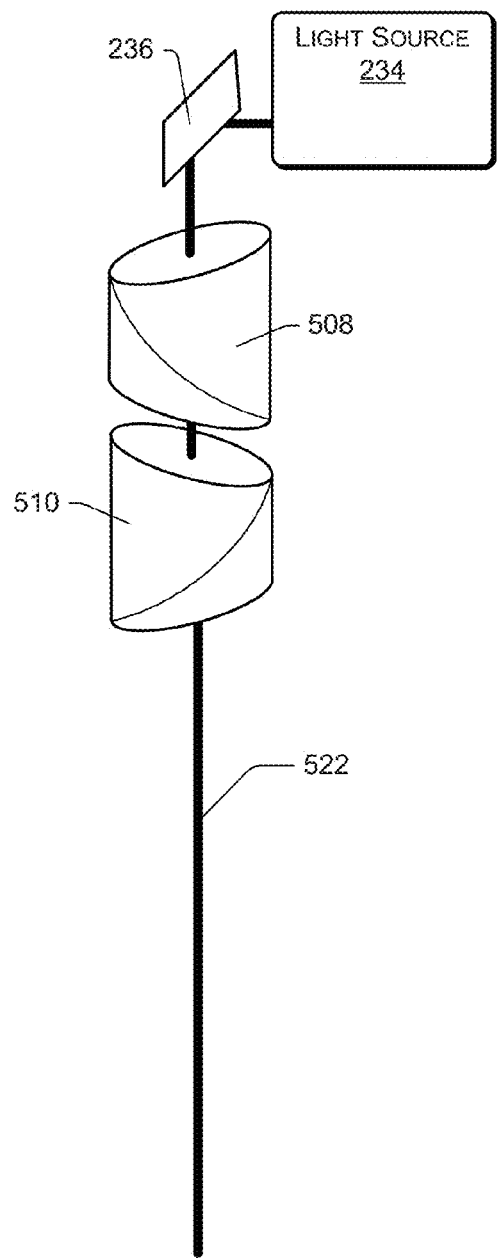
Figure 8:
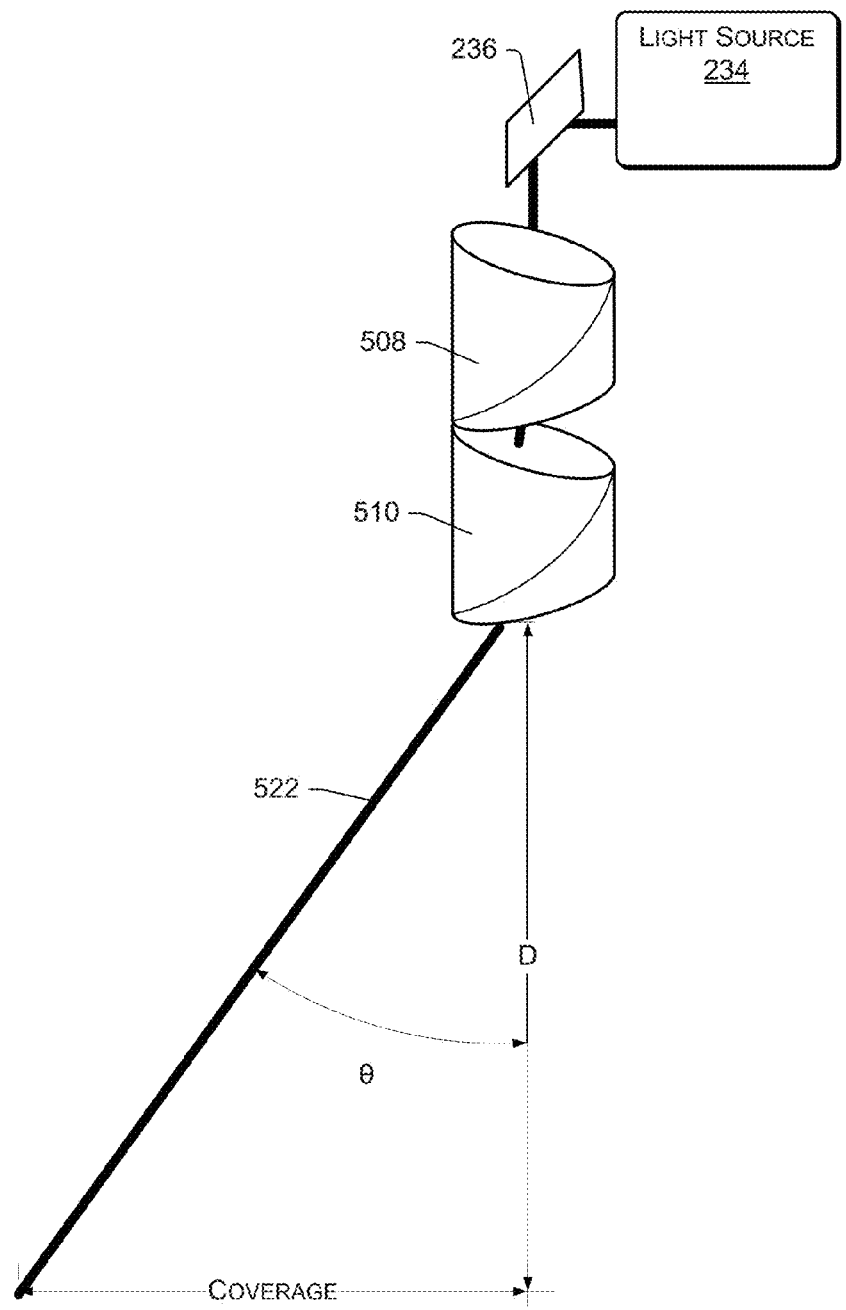

FIGS. 6-8 show a sequence of operational positions of the refractive beam steerer of the project images in different directions. FIG. 6 shows the prisms 508 and 510 substantially in the positions as shown in FIG. 5. When the long sides of the prisms are aligned on the right hand side as shown, the projected beam 522 is at the maximum angle θ from the center axis to the right, thereby providing the widest coverage to the right. The light beam 522 is at least partly refracted a first time when passing through the transition surfaces of the first prism 508 and at least partly refracted a second time when passing through the transition surfaces of the second prism 510 to achieve the angled exit path shown in FIG. 6.

The prisms 508 and 510 are independently rotatable to change the direction of the beam 522. Suppose, for example, the target location moves from a point near current beam 522 in FIG. 6 to a location directly beneath the projector. As the target location moves, the system may adjust one or both of the prisms 508 and 510 to change direction of the beam. Suppose, for example, that the second prism 510 is rotated 180 degrees. During this rotation, the projected beam is redirected from its current location in FIG. 6 back toward a point beneath the projector, as shown next in FIG. 7.

FIG. 7 shows the prisms 508 and 510, where the lower prism 510 is rotated 180 degrees from its state in FIG. 6. In this arrangement, the projected light path 522 is substantially parallel with the center axis 512 to direct the beam to a location beneath the projector. In this case, any refraction occurring at the surfaces is corrected by the opposite orientations so that the resulting beam is relatively straight down.

FIG. 8 shows the prisms 508 and 510 when both are rotated approximately 180 degrees from their positions as shown in FIG. 6. When the long sides of the prisms are aligned on the left hand side as shown, the projected beam 522 is at the maximum angle θ from the center axis to the left, thereby providing the widest coverage to the left.

With the dual prism assembly, the projector 232 is able to provide small image projection without bulky telephoto lenses. The laser projector is also capable of fast redirection of brilliant color images across a room using the two rotating wedge-shaped prisms 508 and 510 and the MEMS 236. Further, any keystone distortion may be correctable via modification of scan amplitude.

Figure 9A:
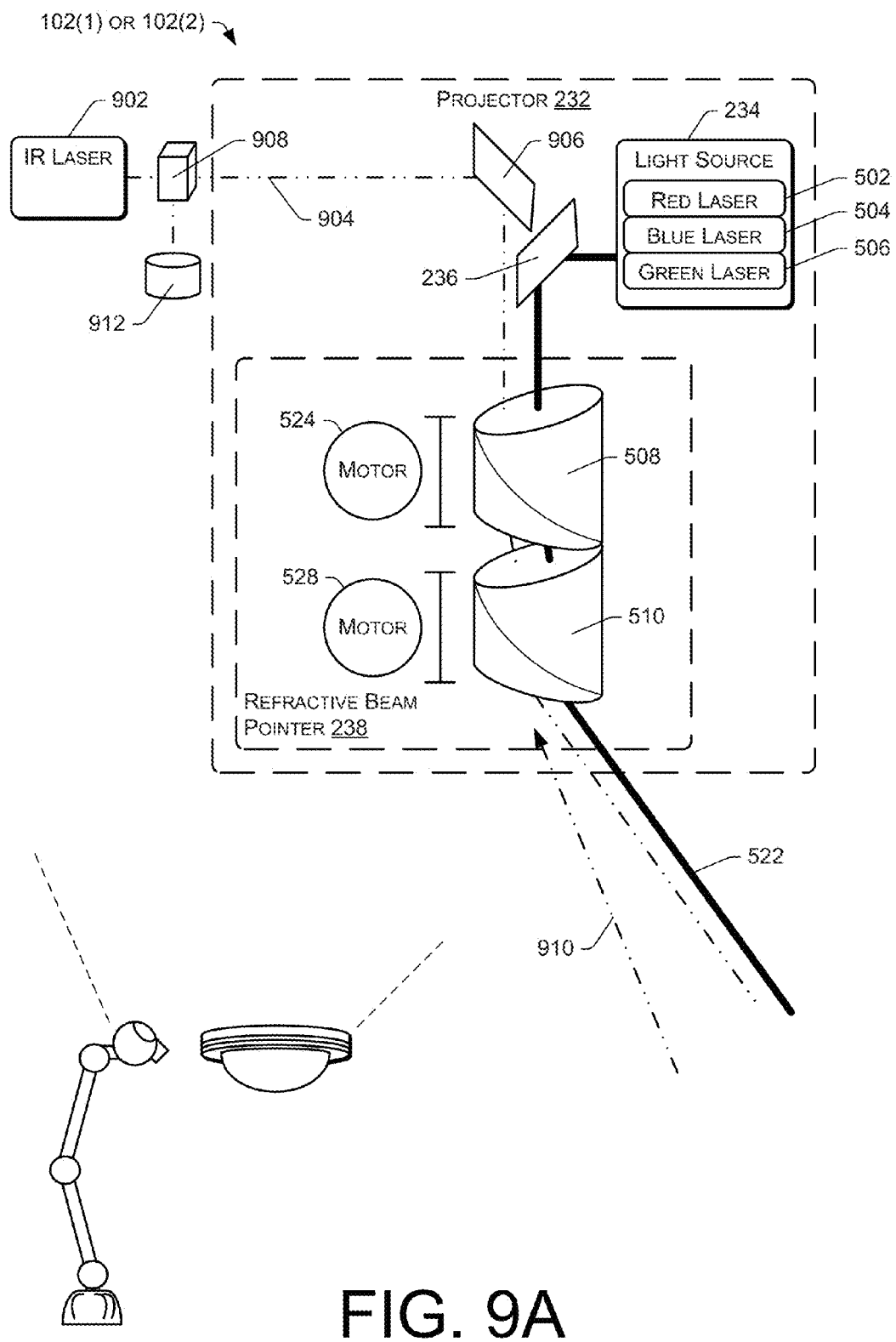
FIGS. 9A and 9B show a second implementation and a third implementation of a projector used in the projection and imaging system. The second implementation includes an IR laser used to image the environment, where the IR laser emits IR light along the same optical path through the refractive beam steerer as the projected light from the projector. The third implementation includes an IR laser that emits IR light that does not travel along the same optical path through the refractive beam steerer.
Figure 9B:
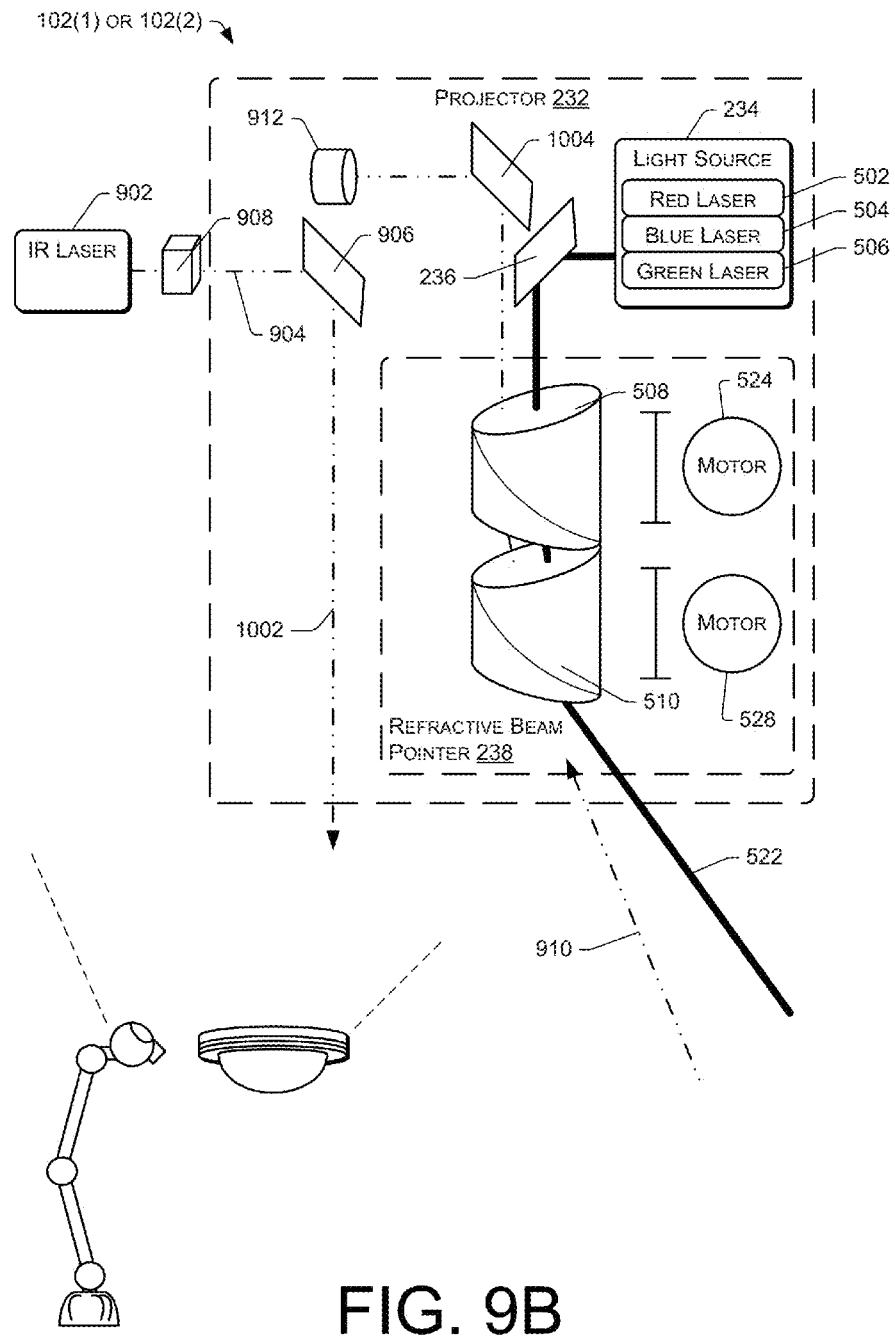

FIGS. 9A and 9B show two more implementations of the projector 232 that may be used in the projection and imaging system. 230 of FIG. 2, which in turn may be implemented as part of each ARFN 102(1) and 102(2). In FIG. 9A, a second implementation of the projector 232 includes an IR device used for depth mapping of the environment. In this implementation, the IR device is configured as an IR laser 902 which emits an IR beam 904. In one example implementation, the IR laser 902 is embodied as an infrared 930 nm laser having a 9 mm diameter and 50 mm length. The IR beam 904 is directed onto a second MEMS 906, which may be configured similarly to the MEMS 236 used for the projected light path. In some implementations, where the projection and depth map areas are congruent, a single MEMS may be used in place of two MEMS.

In some implementations, the IR light 904 is passed through a polarizing element 908 prior to the MEMS 906. The polarizing element 908 applies a polarity to the IR light (e.g., horizontal, vertical, clockwise, counterclockwise). The MEMS 906 redirects the IR beam 904 along the same optical path as the projected light path through the refractive beam steerer 238. The IR beam passes through the prisms 508 and 510, and is refracted similarly to the projected light. In this way, the prisms 508 and 510 define the centerline of a depth mapping region which travels along with the projected images. The projection system may thus enjoy image/map zoom capability with no lenses. Further, coupling projection and depth mapping allows for fast steering and scan amplitude reduction of the depth map for high resolution at minor expense of field of view.

The IR light is reflected and/or scattered from objects in the environment, such as intended projection surfaces of objects. At least some of the reflected IR light, represented as returning beam 910, may be captured by the projector 232 along the same optical path and returned through the refractive beam steerer 238. The reflected IR light 910 may be reflected internally (such as by the MEMS 906 or other reflective element) and ultimately captured by an IR sensor 912. In this implementation, the IR sensor 912 is implemented as a photodiode, which may be about 7 mm in diameter with a sensitive area of 1 mm square. In some implementations, the photodiode may be part of a time of flight (ToF) sensor, which measures IR signal reflections for purposes of determining distances to objects within the environment.

In FIG. 9B, a third implementation of the projector 232 is similar to the implementation of FIG. 9A, but differs in that the laser light 904 emitted from the IR laser 902 follows a path independent of the optical path through the prisms 508 and 510 of the refractive beam steerer 238. In this example, the laser light 904 is directed onto the second MEMS 906, and directed out along a path 1002 independent of the path through the beam steerer 238. The IR light is then passed into the environment, where it is reflected and/or scattered by objects.

In this implementation, at least some of the reflected IR light, represented as returning beam 910, may be captured by the projector 232 along the same optical path and returned through the refractive beam steerer 238. The reflected IR light 910 may be reflected internally by a reflector 1004 (e.g., a mirror) and ultimately captured by an IR sensor 912.

Figure 10:
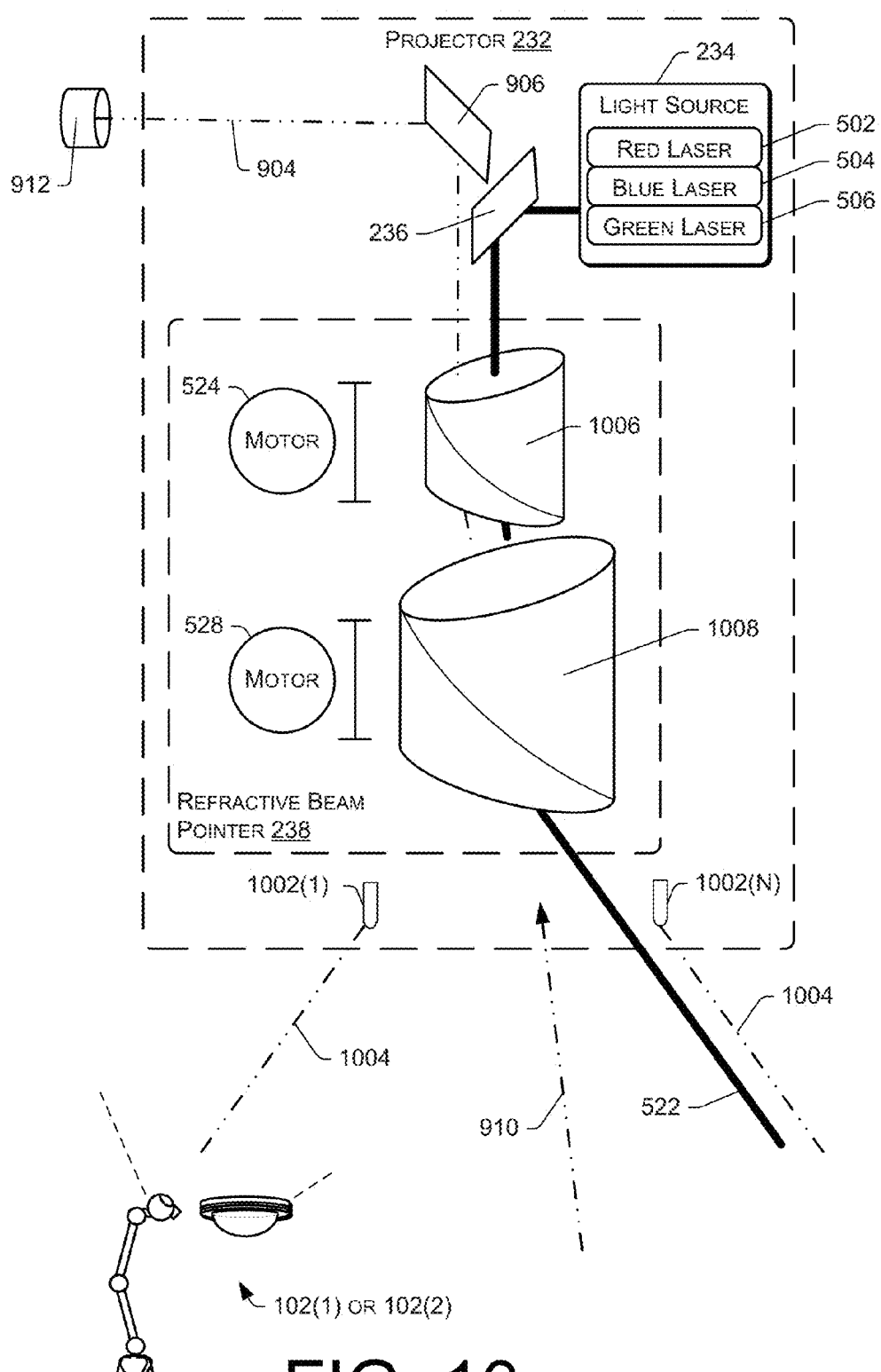
FIG. 10 shows a fourth implementation of a projector used in the projection and imaging system. This fourth implementation includes a separate IR source used to illuminate the environment.

FIG. 10 shows a fourth implementation of the projector 232 used in the projection and imaging system. 230 of FIG. 2, which may be implemented as part of each ARFN 102(1) and 102(2). This fourth implementation includes a separate IR source instead of the IR laser. More particularly, one or more IR emitters 1002(1)-(N), such as IR LEDs, are positioned in the projector 232 to direct IR light 1004 in the direction of the projected image to illuminate the scene onto which the images are being projected. The IR emitters 1002 may be arranged such that the illumination field is wider than the projected field. That is, in this implementation where the IR emitters 1002 are decoupled from the optical path through the beam steerer 238, a larger field of view may be obtained. The IR signals are scattered from objects in the scene and returned to the beam steerer 238. The reflected IR light is once again captured through the refractive beam steerer 238 and directed to the IR sensor 912.

Also, in the FIG. 10 implementation, different sized prisms are shown to illustrate that the prisms may be different in shape and/or size. Here, the first prism 1006 is smaller than the second prism 1008. As before, each of these prisms is independently rotatable about a center axis to steer the projection beam to a desired location.

While not shown in the above figures, another implementation involves using low rotational interia prisms as the primary scan actuators. In this implementation, the MEMS 236 is replaced with a reflector and the prisms are independently spun at high speeds to enable scanning. Depending upon the frequency, the speeds may be considerably high.

Figure 11:
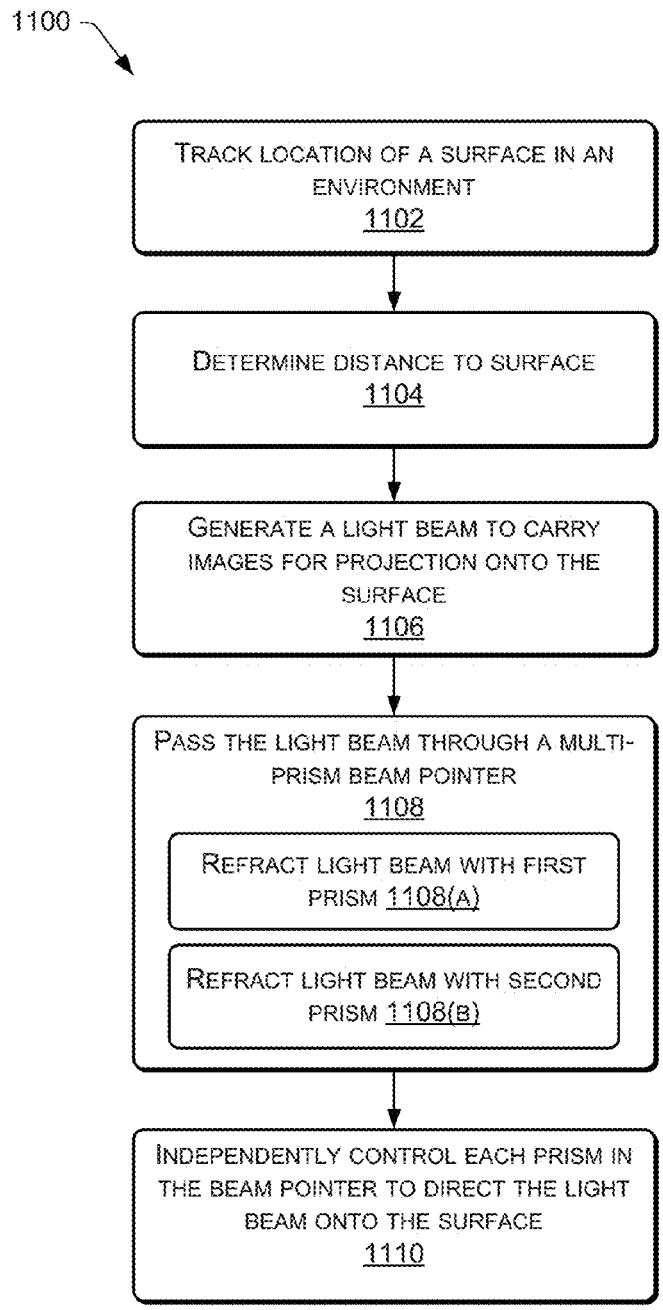
FIG. 11 is a flow diagram of a process for operating the projection and imaging system.

FIG. 11 shows an illustrative process 1100 for operating a projection system with a beam steerer, as provided in various implementations of FIGS. 5-10. The processes described herein may be implemented by the systems and architectures described herein, or by other systems and architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1102, the projection and imaging system tracks location of a surface in an environment. For instance, as shown in FIG. 1, the ARFN 102(1) may track the surface of the portable screen 104. In one particular implementation, the tracking and control module 226 of the augmented reality module 224 is configured to track the surface through one or more various techniques, including time-of-flight or image capture technologies discussed above.

At 1104, a distance to the target surface is determined. The distance may be computed, for example, through use of various technologies, including time-of-flight calculations, radar, LIDAR, ultrasonic ranging, stereoscopic ranging, and so forth.

At 1106, a light beam carrying images for projection onto the target surface is generated. In the described implementation, an image generator 500 creates this light beam. The image generator includes the laser light source 234 that produces a full color spectrum of light and the MEMS 236 that creates the images, pixel-by-pixel, for output to the beam steerer.

At 1108, the light beam is passed through the refractive beam steerer. More particularly, the light beam emitted from the image generator 500 is passed through the first and second prisms 508 and 510, where the light beam can be bent or refracted into various locations within the cone of coverage. Accordingly, as part of this operation, the light beam is at least partly refracted a first time by the various angled surfaces in the first prism 508 (act 1108(A)) and at least partly refracted a second time by the various angled surfaces in the second prism 510 (act 1108(B)).

At 1110, each prism of the beam steerer may be independently controlled to direct the light beam onto the target surface. In the implementation described above, as each prism is rotated about its center axis, the various end and internal surface angles are changed relative to the incoming light beam to cause different degrees of refraction. This allows the projection system to adjust the direction of the beam onto the target surface, even if the target surface is moving around within the environment.

In some implementations, IR light may also be passed through the same multi-prism beam steerer. In this way, the IR light used for depth analysis and other functions may be guided in the same direction as the projected light beam.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
    at least two color lasers to produce visible light having at least two different wavelengths;
    a microelectromechanical system (MEMS) mirror configured to receive the visible light from the at least two color lasers and to reflect portions of the visible light to project an image-bearing light beam into an environment;
    multiple independently rotatable prisms to receive the image-bearing light beam from the MEMS mirror and direct the image-bearing light beam to a location in the environment, the multiple independently rotatable prisms comprising at least a first prism having a first shape and a second prism having a second shape different from the first shape, the first prism and the second prism aligned along a center axis and independently rotatable around the center axis to redirect the image-bearing light beam in one of multiple possible directions within the environment;
    an infrared (IR) light source configured to emit IR light for illuminating at least a portion of the environment, wherein at least part of the IR light passes through the first prism and the second prism and into the environment where the at least part of the IR light is reflected, as reflected IR light, by an object in the environment; and
    a sensor configured to receive at least a portion of the reflected IR light reflected by the object in the environment, wherein the at least the portion of the reflected IR light passes through the first prism and the second prism from the environment to the sensor.

2. The device of claim 1, wherein each of the first prism and second prism have a cylindrical body formed of a glass material and two opposing end surfaces, wherein at least one of the opposing end surfaces is angled relative to the center axis by an angle within a range of 20 degrees and 70 degrees.

3. The device of claim 1, wherein each of the first prism and second prism comprises an achromatic cylindrical body formed of a combination of at least two glasses joined together along angled interfacing surfaces, wherein the at least two glasses comprise a crown glass and a flint glass.

4. The device of claim 1, wherein each of the first prism and second prism comprises a cylindrical body and two opposing end surfaces, the cylindrical body being formed of a combination of at least two glasses joined together along angled interfacing surfaces, wherein both of the two opposing end surfaces are angled relative to the center axis by angles within a range of 20 degrees and 70 degrees and the angled interfacing surfaces are angled relative to the center axis by angles within a range of 40 degrees to 50 degrees.

5. The device of claim 1, wherein the MEMS mirror is a first MEMS mirror, the device further comprising:
    a polarizing element to polarize the IR light from the IR light source; and
    a second MEMS mirror configured to receive the polarized IR light from the polarizing element and to reflect portions of the polarized IR light through the first prism and the second prism into the environment.

6. A projector system comprising:
    a projection component to project light, as projected light, along an optical path, to carry an image onto a surface in an environment;
    an infrared (IR) light source configured to emit IR light for illuminating at least a portion of the environment;
    a polarizing element to polarize the IR light from the IR light source;
    multiple wedge-shaped prisms arranged in the optical path to direct the projected light from the projection component onto the surface in the environment, the multiple wedge-shaped prisms being aligned along a common center axis and each of the multiple wedge-shaped prisms being independently rotatable about the common center axis to control direction of the projected light;
    a microelectromechanical system (MEMS) mirror configured to receive the polarized IR light from the polarizing element and to reflect portions of the polarized IR light along the optical path through the multiple wedge-shaped prisms and into the environment; and
    a sensor configured to receive, as reflected IR light, at least a portion of the polarized IR light reflected from an object or the surface in the environment, the reflected IR light passing through the multiple wedge-shaped prisms to the sensor.

7. The projector system of claim 6, wherein the projection component comprises a red laser, a blue laser, and a green laser.

8. The projector system of claim 6, wherein the MEMS mirror is a first MEMS mirror, and wherein the projection component comprises:
    a laser light source configured to emit visible light; and
    a second MEMS mirror to reflect the visible light emitted by the laser light source to form the image.

9. The projector system of claim 6, wherein each of the multiple wedge-shaped prisms comprises a cylindrical body aligned along, and rotatable about, the common center axis.

10. The projector system of claim 6, wherein each of the multiple wedge-shaped prisms comprises a combination of at least two glasses joined together along angled interfacing surfaces, wherein the at least two glasses comprise a crown glass and a flint glass.

11. The projector system of claim 6, wherein each of the multiple wedge-shaped prisms have a cylindrical body with opposing end surfaces, the cylindrical body being aligned along, and rotatable about, the common center axis and at least one of the opposing end surfaces being angled so that the common center axis is not normal to the at least one of the opposing end surfaces.

12. The projector system of claim 11, wherein both of the opposing end surfaces are angled relative to the common center axis within a range from approximately 20 degrees to approximately 70 degrees.

13. The projector system of claim 6, further comprising at least one motor and a mechanical coupling to couple the motor to at least one of the multiple wedge-shaped prisms, wherein the motor is configured to power rotation of the at least one of the multiple wedge-shaped prisms.

14. A device for use in a projection system, the device comprising:
- a first wedge-shaped prism having a first sized body aligned along, and configured to rotate about, a center axis, the first wedge-shaped prism having a first end surface through which a light beam enters the first wedge-shaped prism and a second end surface through which the light beam exits the first wedge-shaped prism, at least one of the first and second end surfaces of the first wedge-shaped prism being angled so that the center axis is not normal to the at least one of the first and second end surfaces; and
- a second wedge-shaped prism having a second sized body different from the first wedge-shaped prism, the second wedge-shaped prism aligned along, and configured to rotate about, the center axis, the second wedge-shaped prism having a first end surface through which the light beam enters the second wedge-shaped prism and a second end surface through which the light beam exits the second wedge-shaped prism, at least one of the first and second end surfaces of the second wedge-shaped prism being angled so that the center axis is not normal to the at least one of the first and second end surfaces;
- wherein the first and second end surfaces of each of the first and second wedge-shaped prisms are angled relative to the center axis within a range from approximately 20 degrees to approximately 70 degrees; and
- wherein the first wedge-shaped prism and the second wedge-shaped prism rotate about the center axis independently of each other to collectively direct the light beam into an environment.

15. The device of claim 14, wherein at least one of the first or second wedge-shaped prisms is formed of achromatic glass coated with an antireflection coating.

16. The device of claim 14, wherein each of the first and second wedge-shaped prisms comprises an achromatic cylindrical body formed of a combination of at least two glasses joined together along angled interfacing surfaces, wherein the at least two glasses comprise a crown glass and a flint glass.

17. A method comprising:
- receiving a light beam to be projected into an environment;
- directing the light beam, using at least a first microelectromechanical system (MEMS) mirror, onto a target surface in the environment to present images on the target surface, the directing comprising:
  - at least partly refracting the light beam a first time through use of a first wedge-shaped prism having a first size; and
  - at least partly refracting the light beam a second time through use of a second wedge-shaped prism having a second size different than the first size so that the light beam following the second time of refracting is directed onto the target surface; and
- detecting, by a detector, infrared (IR) light reflected by the target surface, the detecting comprising at least directing a reflected portion of the IR light using a second MEMS mirror, the reflected portion of the IR light passing through the first wedge-shaped prism and the second wedge-shaped prism to the detector.

18. The method of claim 17, further comprising rotating at least one of the first wedge-shaped prism or the second wedge-shaped prism to change direction of the light beam within the environment.

19. The method of claim 17, further comprising:
- tracking a location of the target surface as the target surface is moved from a first location to a second location within the environment; and
- adjusting at least one of the first wedge-shaped prism or the second wedge-shaped prism to direct the light beam from the first location to the second location.

20. The method of claim 19, wherein adjusting at least one of the first wedge-shaped prism or the second wedge-shaped prism comprises rotating the at least one of the first wedge-shaped prism or the second wedge-shaped prism around a center axis.

21. The method of claim 17, further comprising:
- receiving the IR light; and
- directing the IR light into the environment in substantially the same direction as the light beam using the first wedge-shaped prism and the second wedge-shaped prism.

22. The method of claim 17, wherein the first size of the first wedge-shaped prism is smaller than the second size of the second wedge-shaped prism.

23. The method of claim 17, wherein the first wedge-shaped prism and the second wedge-shaped prism comprise a first optical path, the method further comprising projecting IR light into the environment using a second optical path that is different from the first optical path.

* * * * *